March 9, 1943.  J. B. HAMPTON  2,313,544
ARTICLE TURNING MACHINE
Filed Jan. 2, 1942    5 Sheets-Sheet 1

Inventor
JULIUS B. HAMPTON,
By *Clarence A. O'Brien*
Attorney

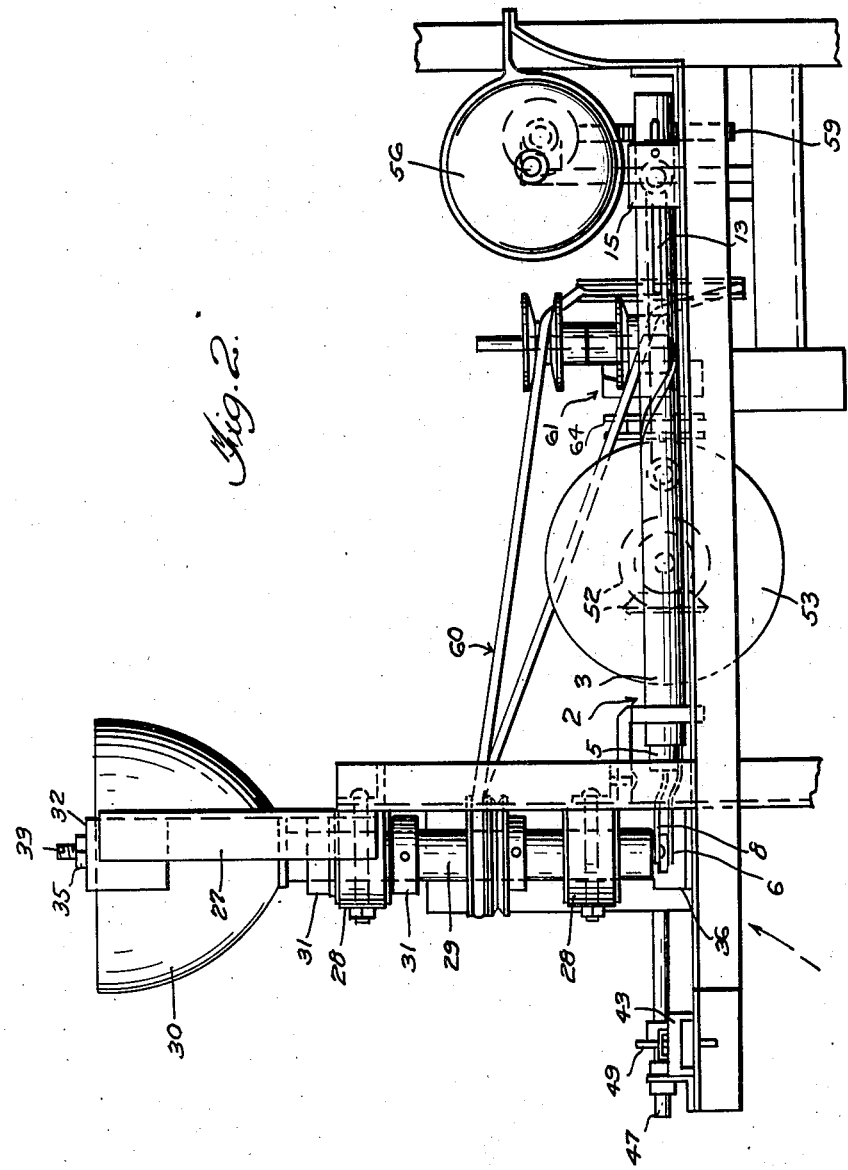

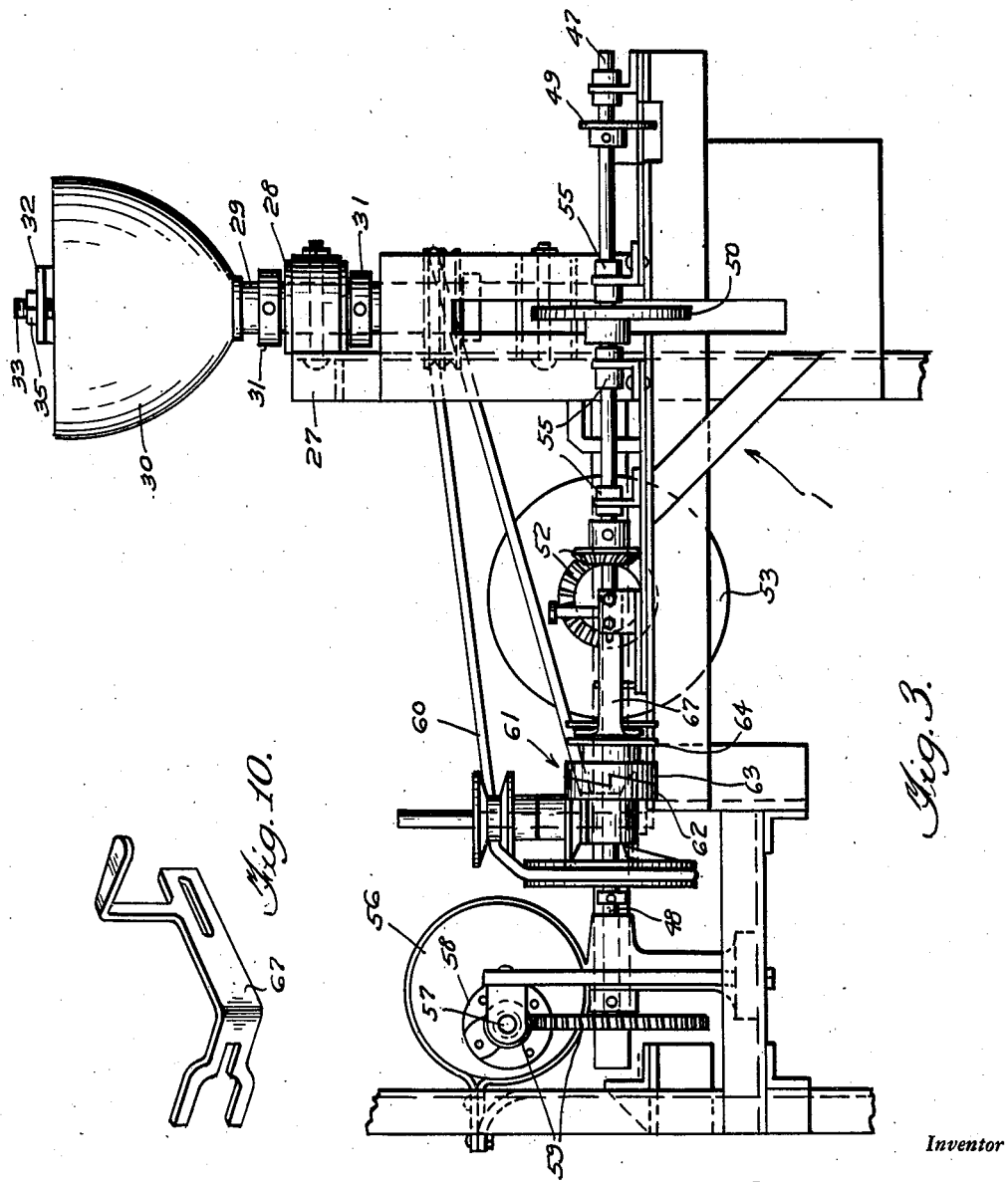

March 9, 1943.  J. B. HAMPTON  2,313,544
ARTICLE TURNING MACHINE
Filed Jan. 2, 1942  5 Sheets-Sheet 4
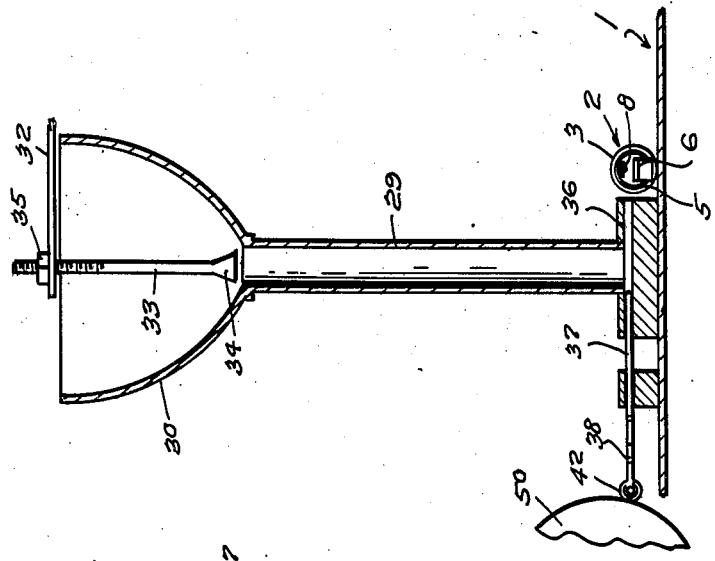
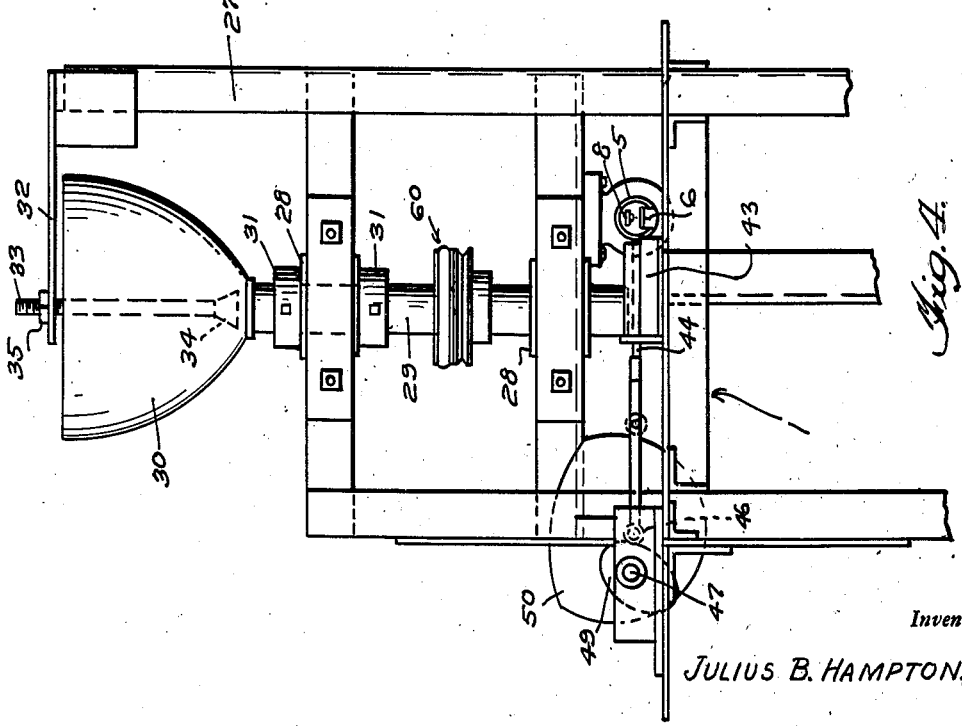
Inventor
JULIUS B. HAMPTON,
By Clarence A. O'Brien
Attorney March 9, 1943.  J. B. HAMPTON  2,313,544
ARTICLE TURNING MACHINE
Filed Jan. 2, 1942  5 Sheets-Sheet 5
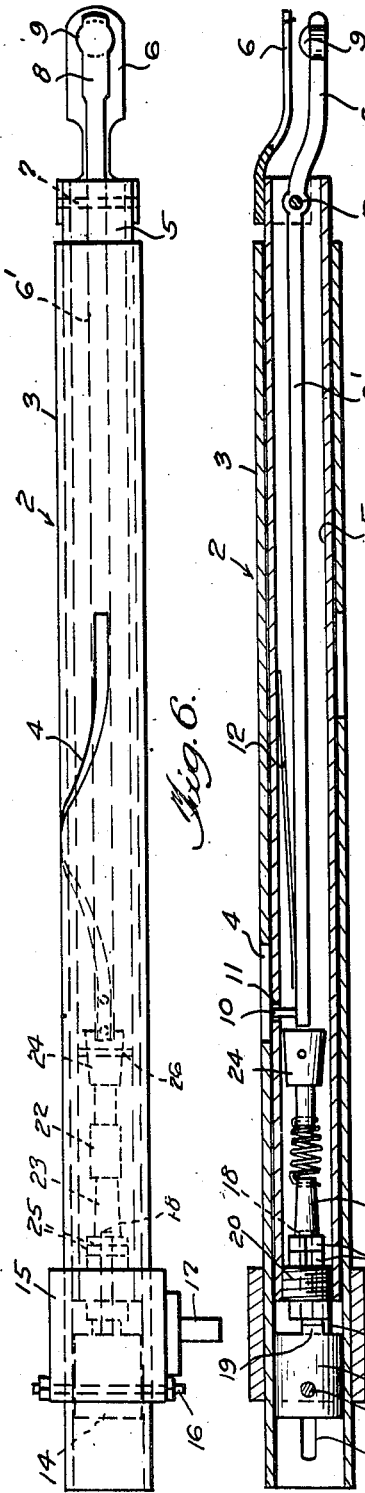
Inventor
JULIUS B. HAMPTON,
By *Clarence A. O'Brien*
Attorney Patented Mar. 9, 1943

2,313,544

UNITED STATES PATENT OFFICE 2,313,544

ARTICLE TURNING MACHINE

Julius B. Hampton, Bessemer, Ala.

Application January 2, 1942, Serial No. 425,472

9 Claims. (Cl. 214—1)

The present invention relates to new and useful improvements in turning machines for flat or substantially flat articles, such as buttons, washers, et cetera, having a depression, slot, or the like, in one side, and has for its primary object to provide, in a manner as hereinafter set forth, a mechanism of the character described which is adapted to deliver such articles one at a time in a predetermined position.

Another very important object of the invention is to provide an article turning machine of the aforementioned character comprising novel means for feeding or delivering the articles to the turning mechanism and for ejecting said articles therefrom.

Other objects of the invention are to provide an article turning machine of the character set forth which will be comparatively simple in construction, strong, durable, highly efficient and reliable in operation, compact, and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is an elevational view, looking at one side of the machine.

Figure 3 is an elevational view, looking at the opposite side of the machine.

Figure 4 is a view in front elevation of the machine.

Figure 5 is a view in vertical section through the article feeding means.

Figure 6 is a top plan view of the article turning unit.

Figure 7 is a view in vertical longitudinal section through the turning unit.

Figure 8 is a view in elevation of the elements which reverse the rotary and slidable member of the turning unit after the article has been turned and ejected.

Figure 9 is a view in end elevation of the turning unit.

Figure 10 is a detail view in perspective of the manually operated slidably mounted clutch engaging fork.

Figure 1:
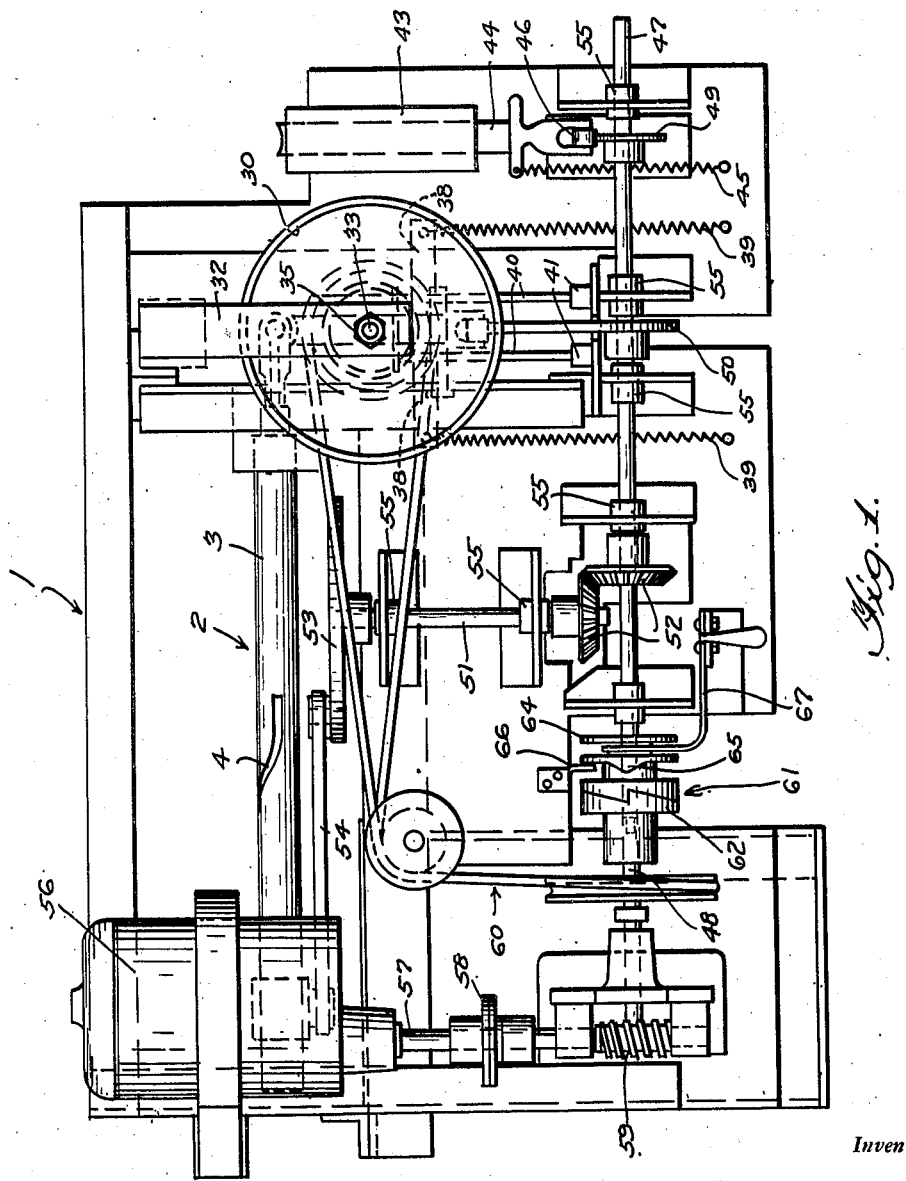
Figure 1 is a top plan view of an article turning machine constructed in accordance with the present invention.

Referring now to the drawings in detail, it will be seen that the embodiment of the mechanism which has been illustrated comprises a stand which is designated generally by reference numeral 1. Mounted horizontally on the stand 1 is an article turning unit 2. The unit 2 includes a stationary sleeve 3 of suitable metal which is open at both ends. At an intermediate point, the stationary sleeve 3 has formed therein a spiral slot 4 which extends half-way around the circumference of said sleeve.

Rotatably and slidably mounted in the stationary sleeve 3 is a metallic tube 5. Projecting from the forward end of the tube 5 is a stationary jaw 6. A lever 6' is pivotally secured at 7 for swinging movement in the tube 5. On the pivoted end of the lever 6' is a jaw 8. The jaws 6 and 8 are adapted to receive and clamp the articles therebetween. The jaw 8 comprises a raised portion or lug 9 which is engageable in the depression, slot, or the like, in one side of the article being handled. On the free end portion of the lever 6' is a pin 10 which is engageable in the spiral slot 4 of the stationary sleeve 3 for rotating the tube 5 when said tube is moved forwardly in said sleeve. The pin 10 is operable in an opening 11 which is provided therefor in the tube 5. A spring 12 in the tube 5 is engaged with the lever 6' for yieldingly resisting opening movement of the pivoted jaw 8 and for withdrawing the pin 10 from the spiral slot 4. The stationary sleeve 3 is further provided, in its rear end portion, with diametrically opposite longitudinal slots 13, the purpose of which will be presently set forth. Slidably mounted in the rear end portion of the stationary sleeve 3 is a cylindrical member 14. Slidable on the rear end portion of the sleeve 3 is a collar 15. A diametrically extending bolt 16 connects the member 14 to the collar 15 for actuation thereby, said bolt being operable in the slots 13. Projecting from one side of the collar 15 is a pin 17.

Projecting longitudinally from the forward end of the member 14 is a partially threaded stem 18. This end of the member 14 is further provided with a stop 19, the purpose of which will also be presently set forth. Threadedly mounted in the rear end portion of the tube 5 is a bushing or the like 20 which is journaled on the smooth inner portion of the stem 18. A lug 21 on one end of the bushing 20 is engageable with the stop 19 for arresting the return rotary movement of the tube 5 at a predetermined point. A return coil spring 22 for reversing the rotation of the tube 5 after the article has been ejected has its ends secured to connectors 23 and 24. The connector 23 is threaded on the stem 18 and secured by lock nuts 25. The connector 24 is pinned at 26 in the tube 5.

Rising from the table 1 is a support 27 having mounted horizontally thereon vertically spaced, aligned bearings 28. Journaled in the bearings 28 is a tube 29. On the upper end of the tube 29 is a hopper 30 for the reception of the articles being handled. Collars 31 are adjustably secured on the tube 29 above and below the upper bearing 28 and constitute means for adjusting said tube vertically.

Mounted on the support 27 is an arm 32 which projects over the hopper 30. Adjustably mounted on the arm 32 and extending downwardly into the hopper 30 is a rod 33. The rod 33 is vertically aligned with the tube 29 and said rod is provided, on its lower end, with a substantially conical baffle 34 for controlling the flow of the articles being handled into said tube. A nut 35 is provided for adjusting the baffle 34.

The lower end portion of the tube 29 extends into a horizontal guide 36 which is mounted transversely on the stand 1. As best seen in Figure 5 of the drawings, the guide 36 is adapted to receive the articles from the tube 29. Operable in the guide 36 is a feeding ejector 37. Arms 38 project in opposite directions from the feeding ejector 37 and have connected thereto retracting springs 39. The feeding ejector 37 is further provided with rods 40 which are slidable in guides 41. A roller 42 is journaled on the rear end of the feeding ejector 37.

Mounted transversely on the forward end portion of the stand 1 is a guide 43.

A discharging ejector 44 is slidable in the guide 43. A retracting spring 45 is connected to the discharging ejector 44. Journaled on the rear end of the discharging ejector 44 is a roller 46.

Mounted longitudinally on the stand 1 are aligned shafts 47 and 48. A cam 49 is fixed on the shaft 47 and engaged with the roller 46 for actuating the discharging ejector 44 against the tension of the spring 45. Also fixed on the shaft 47 is a comparatively large cam 50 which is engaged with the roller 42 for actuating the feeding ejector 37 against the tension of the springs 39.

Mounted transversely on the stand 1 is a shaft 51. Beveled gears 52 connect the shaft 51 to the shaft 47 for actuation thereby. Fixed on one end portion of the shaft 51 is a crank disc 53. A pitman 54 connects the slidable collar 15 to the disc 53 for actuation thereby, one end portion of said pitman being journaled on the pin 17. Suitable bearings 55 are provided for the shafts 47, 48, 51, et cetera.

Mounted on the stand 1 is a suitable electric motor 56. The shaft 57 of the motor 56 has interposed therein a flexible coupling 58. One end portion of the motor shaft 57 is operatively connected to the shaft 48 by suitable gears 59. The tube 29 and the hopper 30 thereon are operatively connected to the shaft 48 for rotation thereby through a belt and pulley drive 60.

The shaft 47 is releasably connected to the shaft 48 for actuation thereby through the medium of a clutch 61. The clutch 61 includes coacting members 62 and 63, the former being fixed on the shaft 48, the latter being splined on the shaft 47. On one end of the clutch member 63 is a channel member 64. The channel member 64 has formed thereon a cam 65 which is engageable with a finger 66 on the stand 1 for disengaging the clutch member 63 from the member 62 upon the completion of each revolution of the shaft 47. A slidable, angular fork 67 is engaged in the channel member 64 for engaging the clutch member 63 with the clutch member 62.

It is thought that the operation of the machine will be readily apparent from a consideration of the foregoing. Briefly, the articles being handled are placed in the rotating hopper 30 from which they drop by gravity through the tube 29 into the guide 36. When the article enters the guide 36 the feeding ejector 37 is moved forwardly by the cam 50 and forces said article between the jaws 6 and 8. If the article happens to be in the correct position when it is received by the unit 2, the protuberance 9 enters the depression, slot, or the like, in one side of said article and the lever 6' with the pin 10 thereon is in the position shown in Figure 7 of the drawings. The tube 5 is now moved forwardly in the stationary sleeve 3 by the pitman 54 and the article between the jaws 6 and 8 is moved into alignment with the guide 43. The ejector 44 now moves forwardly for discharging the article from between the jaws 6 and 8. The pitman 54 then retracts the tube 5 for positioning the jaws 6 and 8 adjacent the guide 36 again for receiving the next article.

Should the wrong side of the article be presented to the jaw 8 when said article is received by the unit 2, the protuberance 9 will engage the substantially flat side of said article and in this manner said jaw 8 is forced open against the tension of the spring 12. Thus, the pin 10 is projected into the spiral slot 4 of the stationary sleeve 3. Now, as the tube 5 is moved forwardly by the pitman 54, the pin 10, traveling in the spiral slot 4, causes the tube 5 to rotate one-half of a revolution. In this manner the article is turned to the desired position before it is discharged from between the jaws 6 and 8 by the ejector 44. As the tube 5 is thus turned or rotated, the spring 22 is wound. When the article which has been turned is ejected from between the jaws 6 and 8, the lever 6' is actuated by the spring 12 in a manner to withdraw the pin 10 from the spiral slot 4. When the tube 5 is thus freed, the spring 22 rotates said tube in the opposite direction for returning the tube to its original position. When this position is reached, the reversely rotating tube 5 is arrested by the finger 21 engaging the stop 19. As hereinbefore brought out, the bushing 20 is threadedly mounted in the tube 5 and is rotatable on the stem 18. The rotating hopper 30 controls the flow of the articles to the tube 29 by centrifugal force, in conjunction with the baffle 34.

Upon the completion of each operation of the machine the cam 65 engages the finger 66 and disengages the clutch 61, thereby disconnecting the shaft 47 from the shaft 48. Momentum carries the cam 65 past the finger 66 for permitting the clutch member 63 to be re-engaged with the member 62 through the medium of the slidably mounted fork 67.

It is believed that the many advantages of an article turning machine constructed in accordance with the present invention will be readily understood, and although a preferred embodiment of the apparatus is as illustrated and described, it is to be understood that changes in the details of construction and in the combination and arrangement of parts may be resorted to which will fall within the scope of the invention as claimed.

What is claimed is:

1. An article turning machine of the character described comprising a stationary sleeve, a member rotatably and slidably mounted in said sleeve, coating jaws on said member for receiving and releasably securing an article therebetween, one of said jaws being movable, and means for operatively connecting the member to the sleeve, under the control of the movable jaw, for rotation by said sleeve upon sliding movement of said member in said sleeve.

2. An article turning machine comprising a stationary sleeve, a member rotatably and slidably mounted in said sleeve, a stationary jaw on the member, a lever pivotally mounted on said member, a movable jaw fixed on the pivoted end of the lever and cooperable with the stationary jaw for receiving and securing an article to be turned, said movable jaw being operable by the article for actuating the lever, and coacting means on the lever and the sleeve for operatively connecting the member to the sleeve for rotation by said sleeve upon sliding movement of said member in said sleeve.

3. An article turning machine comprising a stationary sleeve, a member rotatably and slidably mounted in said sleeve, a stationary jaw on the member, a lever pivotally mounted on said member, a movable jaw fixed on the pivoted end of the lever and cooperable with the stationary jaw for receiving and securing an article to be turned, said movable jaw being operable by the article for actuating the lever, and coacting means on the lever and the sleeve for operatively connecting the member to the sleeve for rotation by said sleeve upon sliding movement of said member in said sleeve, said means including a pin on the lever, the sleeve having a substantially spiral slot therein, said pin being engageable and operable in the slot.

4. An article turning machine comprising a stationary sleeve having a substantially spiral slot therein, a tube rotatably and slidably mounted in said sleeve, a stationary jaw on said tube, a pivoted jaw on the tube, said jaws adapted to receive an article to be turned thereby, said pivoted jaw being movable by the article, means for moving the tube longitudinally in the sleeve, coacting means on the tube and the sleeve, under the control of the pivoted jaw, for operatively and releasably connecting the tube to the sleeve for rotation in one direction by said sleeve upon longitudinal movement of said tube in said sleeve, means for disconnecting the tube from the sleeve, and means for rotating the tube in the opposite direction when said tube is disconnected from the sleeve.

5. An article turning machine of the character described comprising a stationary sleeve having a substantially spiral slot therein, a tube rotatably and slidably mounted in said sleeve, a stationary jaw mounted on said tube, a pivoted jaw on the tube, said jaws adapted to receive an article to be turned thereby, the pivoted jaw being movable by said article, a lever fixed on the pivoted end of the pivoted jaw and operable in the tube, means for sliding the tube in the sleeve, a pin on the free end portion of the lever engageable in the slot for operatively releasably connecting the tube to the sleeve for rotation in one direction by said sleeve upon sliding movement of said tube, means for actuating the lever for disengaging the pin from the slot for disconnecting the tube from the sleeve, and resilient means for rotating the tube in the opposite direction when the pin is disengaged from the slot.

6. An article turning machine of the character described comprising a turning unit including a rotary and slidable tube, coacting stationary and pivoted jaws on said tube for the reception of an article to be turned thereby, the pivoted jaw being movable by the article, means for engaging an article to be turned between the jaws, means for sliding the tube longitudinally, means controlled by the pivoted jaw for rotating the tube upon sliding movement thereof, and means for removing the article from between the jaws.

7. An article turning machine of the character described comprising a rotary and slidable member, coacting jaws on the member for receiving and retaining an article to be turned, one of said jaws being pivoted, means for moving the member longitudinally, and means controlled by the pivoted jaw for rotating the member upon longitudinal movement thereof.

8. An article turning machine of the character described comprising a turning unit including a slidable and rotary member, coacting jaws on said member for receiving and releasably securing an article to be turned thereby, a hopper for the reception of the articles, a discharge tube communicating with the hopper, means for feeding the articles from the tube to the jaws, means for sliding the member, means controlled by one of the jaws for rotating the member upon sliding movement thereof, and means for ejecting the article from between the jaws.

9. An article turning machine of the character described comprising a stand, a turning unit mounted on said stand, said unit including a stationary sleeve, a tube rotatably and slidably mounted in said sleeve, stationary and pivoted jaws on the tube for receiving and retaining an article therebetween, coacting means on the tube and the sleeve, controlled by the pivoted jaw, for operatively and releasably connecting the tube to the sleeve for rotation in one direction by said sleeve upon sliding movement of said tube in said sleeve, a rotary hopper for the reception of articles, a discharge tube communicating with said hopper, means for feeding the articles from the discharge tube to the jaws, means for ejecting the articles from between the jaws, common means on the stand for actuating the hopper, the feeding and ejecting means and for sliding the tube in the sleeve, means for disconnecting the tube from the sleeve, and means for rotating the tube in the opposite direction when said tube is disconnected from said sleeve.

JULIUS B. HAMPTON.